US011184482B2

(12) United States Patent
Tsao et al.

(10) Patent No.: US 11,184,482 B2
(45) Date of Patent: Nov. 23, 2021

(54) INFERRING RELATIONSHIPS BETWEEN CALL INFORMATION AND CRM DATA OBJECTS

(71) Applicant: Talkdesk, Inc, San Francisco, CA (US)

(72) Inventors: Rachel Tsao, San Francisco, CA (US); Miguel Mota, Lisbon (PT); Mario Carvalho, Lisbon (PT)

(73) Assignee: Talkdesk, Inc., San Francisco, CA (US)

( * ) Notice: Subject to any disclaimer, the term of this patent is extended or adjusted under 35 U.S.C. 154(b) by 97 days.

(21) Appl. No.: 16/548,318

(22) Filed: Aug. 22, 2019

(65) Prior Publication Data

US 2020/0374395 A1 Nov. 26, 2020

Related U.S. Application Data

(60) Provisional application No. 62/850,878, filed on May 21, 2019.

(51) Int. Cl.
| | | |
|---|---|---|
| H04M 3/51 | (2006.01) | |
| G06F 3/0482 | (2013.01) | |
| H04M 3/22 | (2006.01) | |
| G06N 5/04 | (2006.01) | |
| G06N 20/00 | (2019.01) | |
| G06Q 30/00 | (2012.01) | |
| H04M 3/42 | (2006.01) | |
| H04M 7/00 | (2006.01) | |

(52) U.S. Cl.
CPC ........ *H04M 3/5183* (2013.01); *G06F 3/0482* (2013.01); *G06N 5/04* (2013.01); *G06N 20/00* (2019.01); *G06Q 30/016* (2013.01); *H04M 3/2218* (2013.01); *H04M 3/42042* (2013.01); *H04M 3/42068* (2013.01); *H04M 3/5133* (2013.01); *H04M 7/0012* (2013.01); *H04M 2201/42* (2013.01)

(58) Field of Classification Search
CPC ............ H04M 3/5183; H04M 3/2218; H04M 3/42042; H04M 3/42068; H04M 3/5133; G06F 3/0482; G06N 5/04
USPC .................................................... 379/265.09
See application file for complete search history.

(56) References Cited

U.S. PATENT DOCUMENTS

| | | | |
|---|---|---|---|
| 8,160,233 B2 * | 4/2012 | Keren ................. | H04M 3/5175 379/265.06 |
| 2020/0134492 A1 * | 4/2020 | Copeland ................ | G10L 15/22 |

* cited by examiner

*Primary Examiner* — Harry S Hong
*Assistant Examiner* — Jirapon Intavong
(74) *Attorney, Agent, or Firm* — Rimon PC; Marc Kaufman

(57) ABSTRACT

A system uses intelligent logic to determine information from a communication and to infer relevant CRM objects that may be related the communication. The system further presents a user interface with the communication information and the related CRM objects to allow an agent to review, select, and relate the communication information to one or more CRM objects. Accordingly, the embodiments described herein improve the efficiency of communication management systems and CRM systems by providing an intelligent logic and unique user interface that greatly reduces the number of steps needed to relate communication information with a CRM object.

11 Claims, 10 Drawing Sheets

INFERRING RELATIONSHIPS BETWEEN CALL INFORMATION AND CRM DATA OBJECTS

CROSS-REFERENCE TO RELATED APPLICATIONS

This application claims priority to U.S. Provisional Application Ser. No. 62/850,878 filed on May 21, 2019. The contents of which are hereby incorporated by reference.

BACKGROUND

Modern companies and organizations use a variety of technologies to manage and organize contact with customers, employees, and members. For example, a company may use a contact center as a primary touch point for customers to reach out to the company with a variety of requests and needs (e.g., customer support, product information, etc.). In addition, the same company may also use a customer-relationship management system (or CRM system) to maintain and organize the company's interaction with current and potential customers. While modern CRM systems can receive and use data from a contact center, often there is a disconnect between the two systems that complicates or prevents the use of data from the CRM system to perform actions in the contact center.

One example of this disconnect is that when making a call using a conventional contact center, the service agents and sales personnel often want to relate call activity to a relevant CRM system object (e.g., a case ID, opportunity, a contact, etc.). Conventional systems, however, have typically been unable to achieve this type of functionality in a relevant way for agents and sales personnel. In particular, in conventional systems, an agent would often need to access one or more user interfaces associated with the communication management system to gather (e.g., copy) information about the phone call. Next, the agent would need to change applications and access one or more user interfaces within the CRM system to manually enter the call information into the CRM system. This would require several steps, clicks, selections of menus, and was often so cumbersome and unintuitive that agents and sales personal would simply not attempt to jump through all the steps necessary to enter call information into the CRM system. Thus, there are several disadvantages with regard to conventional communication management systems.

SUMMARY

One or more embodiments described herein provide benefits and solve one or more of the foregoing or other problems in the art with systems, methods, and non-transitory computer readable media that provide an interface in coordination with a customer-relationship management system (CRM system) to relate call information with CRM objects that are related to the call. For example, the system uses intelligent logic to determine information from the call (or contact, e.g., phone, text, IM), to infer relevant CRM objects that may be related to the call, and then present a user interface with the call information and the relevant CRM objects to allow an agent to review, select, and relate the call information to one or more of the relevant CRM objects. Accordingly, the embodiments described herein improve the efficiency of communication management systems and CRM systems by providing an intelligent logic and unique user interface that greatly reduces the number of steps needed to identify and relate call information with a CRM object.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
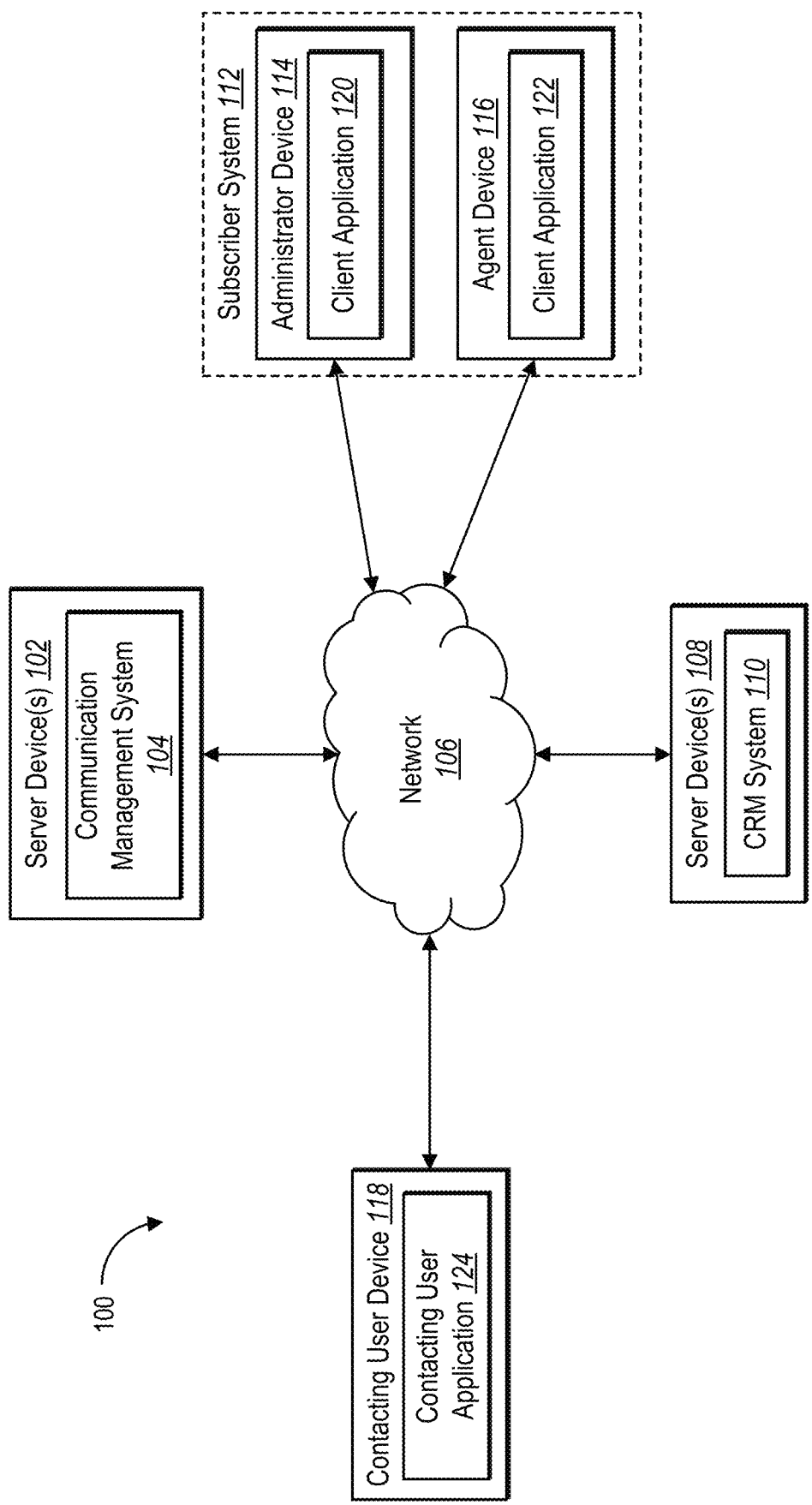
FIG. 1 illustrates an example contact activity relation system in accordance with one or more embodiments.

One or more embodiments described herein provide benefits and solve one or more of the foregoing or other problems in the art with systems, methods, and non-transitory computer readable media that provide an interface in coordination with a customer-relationship management system (CRM system) to relate call information with CRM objects that are related to the call (or any other type of communication, such as text, IM, email, etc.). For example, the contact activity relation system uses intelligent logic that utilizes information from a call (and/or agent activity in relation to the call) to infer and identify relevant CRM objects that may be related the call. Then, the contact activity relation system can present a user interface with the call information and the relevant CRM objects to allow an agent to review, select, and relate the call information to one or more CRM objects. Accordingly, the embodiments described herein improve the efficiency of communication management systems and CRM systems by providing intelligent logic (e.g., a relationship algorithm) in combination with a unique user interface that greatly reduces the number of steps needed to relate call information with a CRM object.

As mentioned, the contact activity relation system uses intelligent logic to infer and identify relevant CRM objects during and after a call. In one or more embodiments, the contact activity relation system uses a variety of parameters to infer and identify relevant CRM objects to relate to a call. For example, the contact activity relation system can identify agent activity within the CRM system during the same time period as the call to infer that the agent was interacting with information that related to the call, e.g., a case related to the call. In addition, the contact activity relation system can infer relevant CRM objects based on recently accessed CRM objects, by an agent, with respect to the call time. Accordingly, the contact activity relation system gathers agent activity information from the agent's CRM console, coordinates that activity information with information about the call, and then uses intelligent logic to infer which CRM objects are likely relatable to the call information. The contact activity relation system then provides the agent client device a screen pop GUI with selectable options to relate the call information to the identified CRM objects within the CRM system.

Based on the principles discussed above, and the details provided below, the contact activity relation system provides several advantages and improvements over previous systems. For example, by considering and analyzing agent activity with respect to call information, the contact activity relation system can provide a pop screen GUI that includes the relevant data an agent needs to consider relating call information to a CRM object. In so doing, the contact activity relation system greatly increases the efficiency of the overall system because it provides the information (e.g., the relevant CRM objects) to the agent without the agent needing to perform any additional interactions other than those actions performed normally by accessing CRM data on an as-needed basis. Accordingly, compared to conventional systems that required an agent to navigate between two separate applications and systems, copying and moving data from one system to the other, the contact activity relation system allows the agent to simply confirm the information in a pop screen GUI provided at the end of a call and save the relationship in the CRM system within a matter of seconds (and/or significantly fewer steps compared to conventional systems).

Additionally, by providing a graphical user interface (e.g., a pop screen GUI) with selectable options for relevant CRM objects, the contact activity relation system also utilizes computational resources more efficiently compared to conventional systems. In particular, by reducing the number of steps an agent performs to relate a CRM object to a communication (e.g., without navigating between two separate applications and systems and copying and moving data from one system to the other to relate CRM objects), the contact activity relation system utilizes less computational resources. Specifically, by reducing such steps the contact activity relation system processes less actions taken by an agent to relate CRM objects to a communication. As such, the contact activity relation system can utilize computational resources more efficiently in comparison to conventional systems.

As illustrated by the foregoing discussion, the present disclosure utilizes a variety of terms to describe features and benefits of the contact activity relation system. Additional detail is hereafter provided regarding the meaning of these terms as used in this disclosure. In particular, the term "contacting user" refers to a user that contacts the communication management system. A contacting user can refer to a user that is experiencing a problem or issue with a service system and that contacts the communication management system in an attempt to resolve the problem or to inform others of the problem. For example, a contacting user can include a caller, a chat user, or a text message user that sends an electronic communication to the communication management system. The term "communication" refers to a communication such as a phone call, chat message, text message, instant message, or video call that the communication management system can receive from a contacting user.

Relatedly, the term "agent user" or "agent" refers to an individual or system associated with the communication management system or a service system and that assists a contacting user via electronic communication correspondence. Indeed, the communication management system can connect a contacting user who needs to reschedule a flight with an agent user affiliated with the relevant airline system. Furthermore, the term "agent information" refers to data corresponding to the identity and/or characteristics of an agent user. For example, agent information can include information such as an agent user ID, agent role, and/or average call time associated with an agent.

Furthermore, the term "user interface information" refers to data corresponding to the identity and/or characteristics of a user interface utilized by an agent user. In particular, user interface information can include information such as, but not limited to, a user interface type, a user interface ID, and/or a state corresponding to a user interface (e.g., current tab, current operation, etc.).

The term "CRM data object" or "CRM object" refers to a data structure that is referenced by an identifier. For instance, CRM objects include data structures that define an association between data and a database entity within a CRM system. For instance, a CRM object can represent a case that has a case owner within the CRM system, a lead that has a lead owner (e.g., an opportunity), a contact that has a contact owner or agent, an account that has an account owner, or any other type of customer-relationship that is defined within a CRM system. In one or more embodiments, the CRM object is associated with an agent, multiple agents, a ring group (e.g., a group of agents associated with a particular team, customer service specialty, contact, account, etc.) and numbers or identifiers associated with the agent or ring groups.

Furthermore, the term "CRM object record" (or sometimes referred to as "CRM record") refers to a line (or item) that belongs to the CRM object data structure. In particular, a CRM object record can be referenced by an identifier and represent an item belonging to a CRM object. In one or more embodiments, the contact activity relation system provides, within a relate to field, options to select CRM object records. Indeed, the contact activity relation system can associate a communication to a specific CRM object record and/or to the CRM object as whole based on its identified relevance to the communication in accordance with one or more embodiments herein.

The term "computer telephony integration" or "CTI system" refers to technology that integrates and coordinates interactions between a telephone and a computer. CTI systems can run as a desk-top application, a server application, or a combination of both server and desk-top application. While described herein as being a server application that is part of the overall communication management system (e.g., a call center), it is understood that the CTI system can be on separate servers that the servers of the call center and can be a distributed application that is part of a client application executed on agent devices.

Additional detail regarding the contact activity relation system will now be provided with reference to the figures. For example, FIG. 1 illustrates a schematic diagram of an example environment for implementing a contact activity relation system 100 in accordance with one or more embodiments. An overview of the contact activity relation system 100 is described in relation to FIG. 1. Thereafter, a more detailed description of the components and processes of the contact activity relation system 100 is provided in relation to the subsequent figures.

As shown in FIG. 1, the contact activity relation system 100 includes server device(s) 102 hosting a communication management system 104, server device(s) 108 hosting a CRM system 110, a subscriber system 112, an administrator device 114, an agent device 116, a contacting user device 118, and a network 106. Each of the components of the environment can communicate via the network 106, and the network 106 may be any suitable network over which computing devices can communicate. Example networks are discussed in more detail below in relation to FIGS. 8 and 9.

As mentioned, the contact activity relation system 100 can include different client devices such as the contacting user device 118, the administrator device 114, and the agent device 116. The contacting user device 118 can be one of a variety of computing devices, including a smartphone, tablet, smart television, desktop computer, laptop computer, or other computing device as described in relation to FIGS. 8 and 9. Although FIG. 1 illustrates a single contacting user device 118, in some embodiments the environment (of the contact activity relation system 100) can include multiple different contacting user devices, each associated with a different contacting user. The contacting user device 118 can receive user input and other information and provide the information (including communication dialogue and contacting user information) to the server device(s) 102 and/or the server device(s) 108.

As shown, the contacting user device 118 includes a contacting user application 124. In particular, the contacting user application 124 may be a web application, a native application installed on the contacting user device 118 (e.g., a mobile application, a desktop application, etc.), or a cloud-based application where part of the functionality is performed by the server device(s) 102 and/or the server device(s) 108.

As also mentioned, the contact activity relation system 100 includes an administrator device 114 and an agent device 116. Like the contacting user device 118, the administrator device 114 and agent device 116 can be a one of a variety of computing devices, including a smartphone, tablet, smart television, desktop computer, laptop computer, or other computing device as described in relation to FIGS. 8 and 9. Although FIG. 1 illustrates a single agent device, in some embodiments the environment (of the contact activity relation system 100) can include multiple different agent devices, each associated with a different agent user. The agent device 116 can receive user input from an agent user and receive information (including communication dialogue, contacting user information, a purpose prediction, CRM objects, and/or an agent transcript) from the server device(s) 102 and/or the server device(s) 108.

As shown, the administrator device 114 includes a client application 120 and the agent device 116 includes a client application 122. In particular, the client application 120 and/or the client application 122 may be a web application, a native application installed on the administrator device or agent device (e.g., a mobile application, a desktop application, etc.), or a cloud-based application where part of the functionality is performed by the server device(s) 102 and/or the server device(s) 108. The client application 120 and/or the client application 122 can present or display information to an administrator or agent user (via the administrator device 114 or the agent device 116 respectively), including a user interface for interacting with a contacting user and presenting information pertaining to the contacting user (e.g., contextual information, an agent transcript, etc.). An agent user can interact with the client application 122 to, for example, help a contacting user with a customer service issue.

As illustrated in FIG. 1, the contact activity relation system 100 includes the subscriber system 112. The subscriber system 112 may be a service system or a different customer support system. In some embodiments, as indicated by the dashed box of FIG. 1, the agent device 116 is associated or affiliated with the subscriber system 112. In these embodiments, the communication management system 104 may provide information such as an electronic communication and contacting user information to the subscriber system 112, whereupon the subscriber system 112 may assign or relay the electronic communication to an agent device (e.g., the agent device 116). In other embodiments, the agent device 116 is not directly associated with the subscriber system 112, and the communication management system 104 provides information to the agent device 116 without necessarily utilizing the subscriber system 112.

As further illustrated in FIG. 1, the contact activity relation system 100 includes the server device(s) 102 hosting the communication management system 104. The communication management system 104 (e.g., a contact center) may generate, store, process, receive, and transmit electronic data, such as electronic communications, communication dialogue, contacting user information, contextual information, etc. For example, the server device(s) 102 may receive data from the contacting user device 118 in the form of an electronic communication and contacting user information. In addition, the server device(s) 102 can transmit data to the agent device 116 to provide the electronic communication and contacting user information. The server device(s) 102 can communicate with the contacting user device 118, the agent device 116, the administrator device 114, the CRM system 110, and the subscriber system 112 to transmit and/or receive data via the network 106. In some embodiments, the server device(s) 102 comprises an application server, a communication server, a web-hosting server, a social networking server, a digital content campaign server, or a digital content management server. Although FIG. 1 depicts the communication management system 104 located on the server device(s) 102, in some embodiments, the communication management system 104 may be implemented by (e.g., located entirely or in part) on one or more other components of the environment (of the contact activity relation system 100). For example, the communication management system 104 may be implemented by the contacting user device 118, the agent device 116, and/or the subscriber system 112.

Additionally, and as shown in FIG. 1, the contact activity relation system 100 includes the server device(s) 108 hosting the CRM system 110. The CRM system 110 (customer-relationship management system) can compile data from a range of different communication channels, including a company's website, email, and social media. In addition, the CRM system 110 can compile and use data from the communication management system 104, such as data from phone calls, text messages, IMs, email, or other contacting user communications.

In some embodiments, though not illustrated in FIG. 1, the contact activity relation system 100 may have a different arrangement of components and/or may have a different number or set of components altogether. For example, the contacting user device 118, the agent device 116, the administrator device 114, the CRM system 110, and the subscriber system 112 may communicate directly with the communication management system 104, by passing the network 106. The communication management system 104 can be implemented in a variety of different ways across the server device(s) 102, the server device(s) 108, the network 106, the agent device 116, the administrator device 114, the contacting user device 118, and the subscriber system 112. Additional detail regarding implementing different components of the contact activity relation system 100 across devices is provided below.

Figure 2:
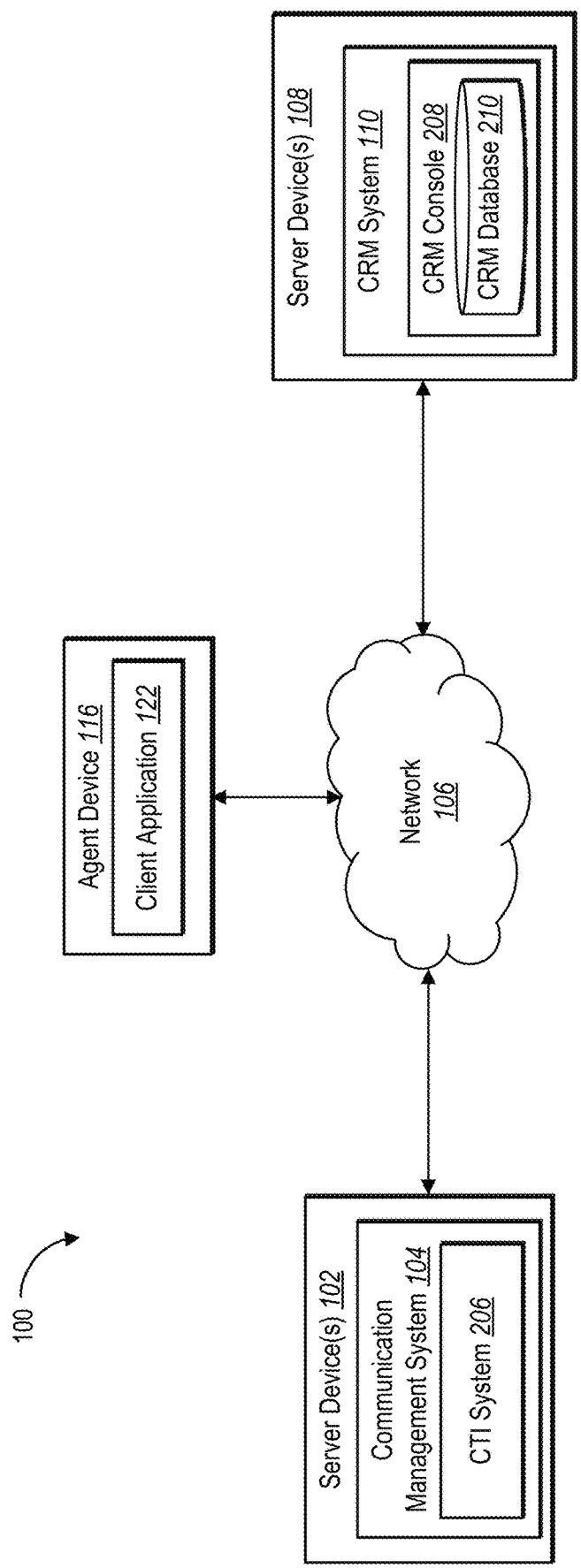
FIG. 2 illustrates additional details of a contact activity relation system in accordance with one or more embodiments.

Furthermore, the contact activity relation system 100 can provide an interface in coordination with the CRM system 110 to relate call information with CRM objects that are related to the call. To that end, FIG. 2 illustrates an example embodiment of the contact activity relation system 100 including the communication management system 104, the CRM system 110, and the agent device 116. As illustrated in FIG. 2, the communication management system 104 includes a CTI system 206, or otherwise function in coordination with a CTI system. The CTI system 206 coordinates interactions with contacting user calls with the agent device 116 and/or CRM system 110. For example, the CTI system 206 can monitor and obtain call information associated with a particular call, including telephone number, contact ID, contact geographical information, and other data and/or information associated with a contacting user. The CTI system 206 can present some or all of this information on the agent device 116 during a call to assist the agent (operating the agent device 116) in responding to the contacting user.

As further illustrated in FIG. 2, the contact activity relation system 100 includes the CRM system 110 that includes a CRM console manager 208 and a CRM database 210. In one or more embodiments, an agent accesses the CRM system 110 and a CRM console corresponding to the CRM console manager 208 via the client application 122 of the agent device 116. In addition, during or after a call, and while accessing the CRM console, the agent device 116 can, via a console user interface, send a request to the CTI system 206 to get a related case or a related opportunity (e.g., a related CRM object in accordance with one or more embodiments herein). Based on the request, the contact activity relation system 100 launches (e.g., at the CTI system 206) a relationship algorithm that utilizes a variety of parameters for input (e.g., one or more parameters discussed in detail below) to identify CRM objects to relate to a communication. The relationship algorithm then analyzes the parameters and generates a related case or related opportunity response that corresponds to one or more CRM objects within the CRM system 110 in accordance with one or more embodiments herein. In some embodiments, the related case or related opportunity response is then serialized into a JSON response that enables the client application 122 to display a pop screen on the agent device 116 that includes any related CRM objects and a list of selectable options (e.g., within a pick list) that allows the agent on the agent device 116 to easily select and/or confirm the related case information in associated with a call (or any other form of communication) from a contacting user.

Although FIGS. 1 and 2 illustrate the contact activity relation system 100 including one or more components that perform the functions of providing an interface in coordination with a CRM system to relate call information with CRM objects that are related to a call, the description herein can refer to the contact activity relation system 100 performing all of the steps for one or more embodiments disclosed herein. Indeed, the one or more embodiments disclosed herein can be performed by the contact activity relation system 100 with any described component and/or in any arrangement of the described components herein.

Figure 3:
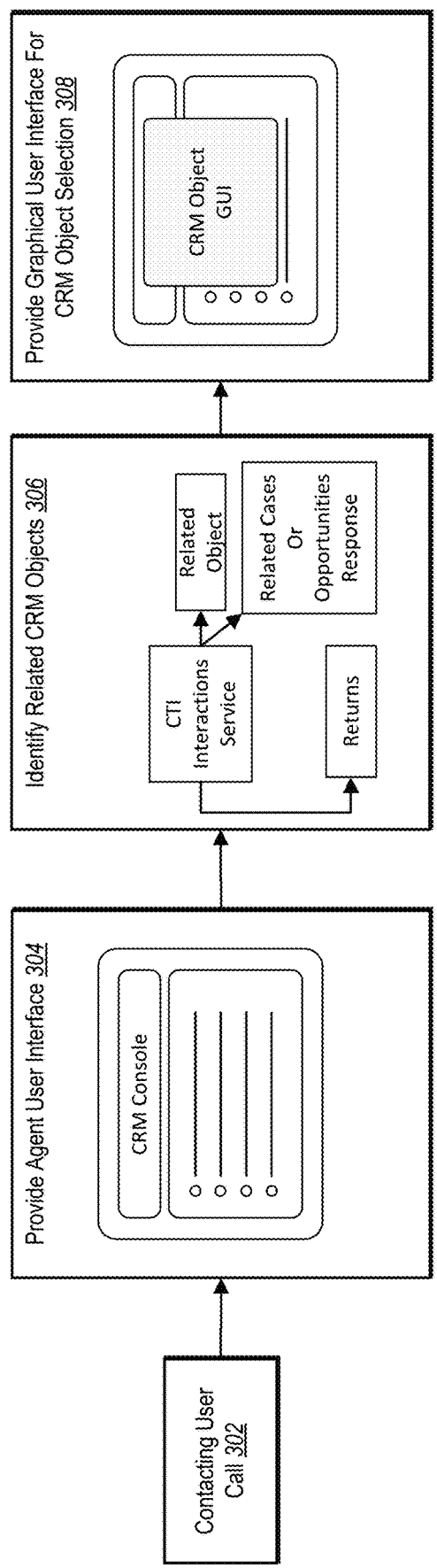
FIG. 3 illustrates an overview of the contact activity relation system identifying and providing CRM objects to relate to a communication in accordance with one or more embodiments.

As mentioned above, the contact activity relation system 100 can identify one or more CRM objects that are relevant to a communication and provide a graphical user interface to relate one or more CRM objects to communication information. For instance, FIG. 3 illustrates the contact activity relation system 100 identifying one or more CRM objects that are relevant to a call and providing a graphical user interface to relate call information with a CRM object that are relevant to the call. Indeed, FIG. 3 illustrates an overview of the contact activity relation system 100 enabling a communication between an agent and a contacting user, identifying CRM objects in response to the communication (e.g., using a relationship algorithm), and displaying a graphical user interface to relate one or more identified CRM objects with communication information related to the call.

For instance, as shown in FIG. 3, the contact activity relation system 100 receives a call from a contacting user (e.g., contacting user call 302) and enables communication between the contacting user and an agent device (operated by an agent). Indeed, as shown in FIG. 3, the contact activity relation system 100 provides a CRM console user interface (i.e., an agent user interface) in an act 304 on the agent device during the contacting user call 302 with information related to the contacting user call 302 (e.g., a CRM graphical user interface and/or a CTI graphical user interface). In reference to FIG. 3, the contact activity relation system 100 can identify information such as the call information, agent information, agent activity, and/or other information (as described in greater detail in FIGS. 5A and 5B) in relation to the contacting user call 302 and/or the agent user interface (in the act 304).

Figure 4:
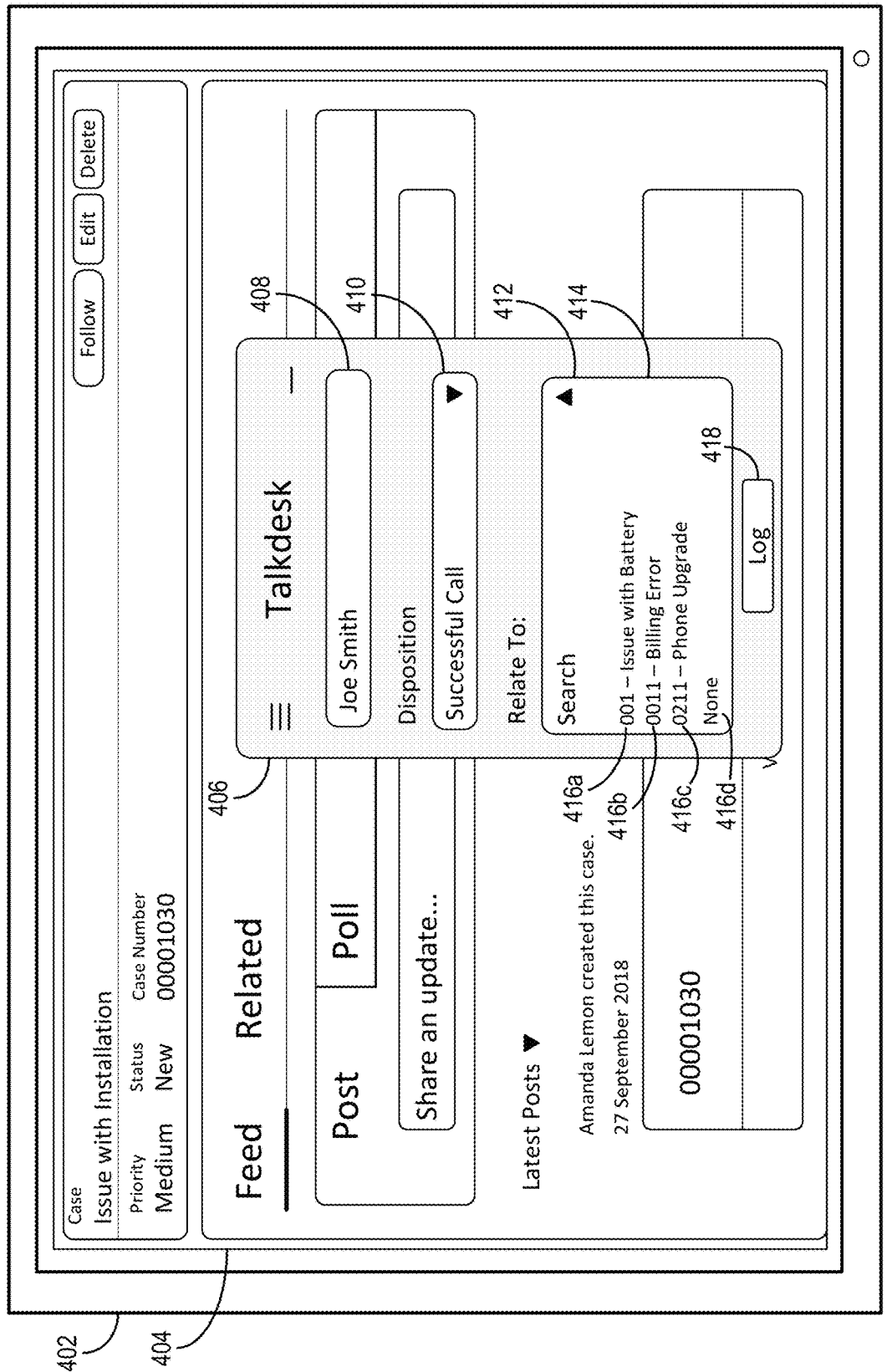
FIG. 4 illustrates an example graphical user interface for relating a CRM object to a communication within a CRM system in accordance with one or more embodiments.
Figure 5A:
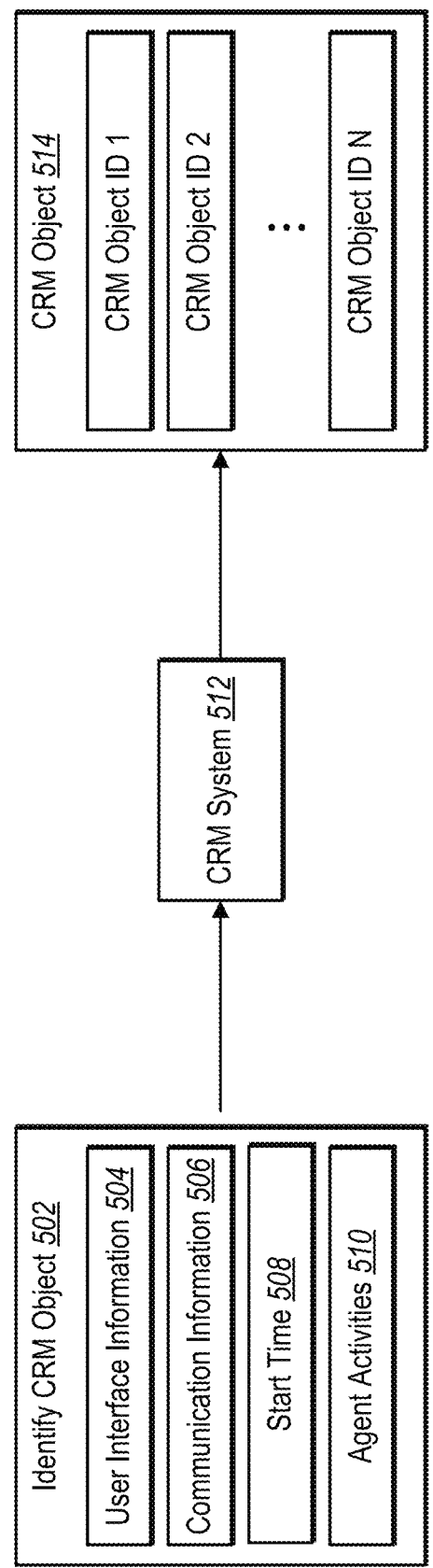
FIG. 5A illustrates an example diagram of a contact activity relation system determining one or more CRM objects related to a communication based on parameters in accordance with one or more embodiments.
Figure 5B:
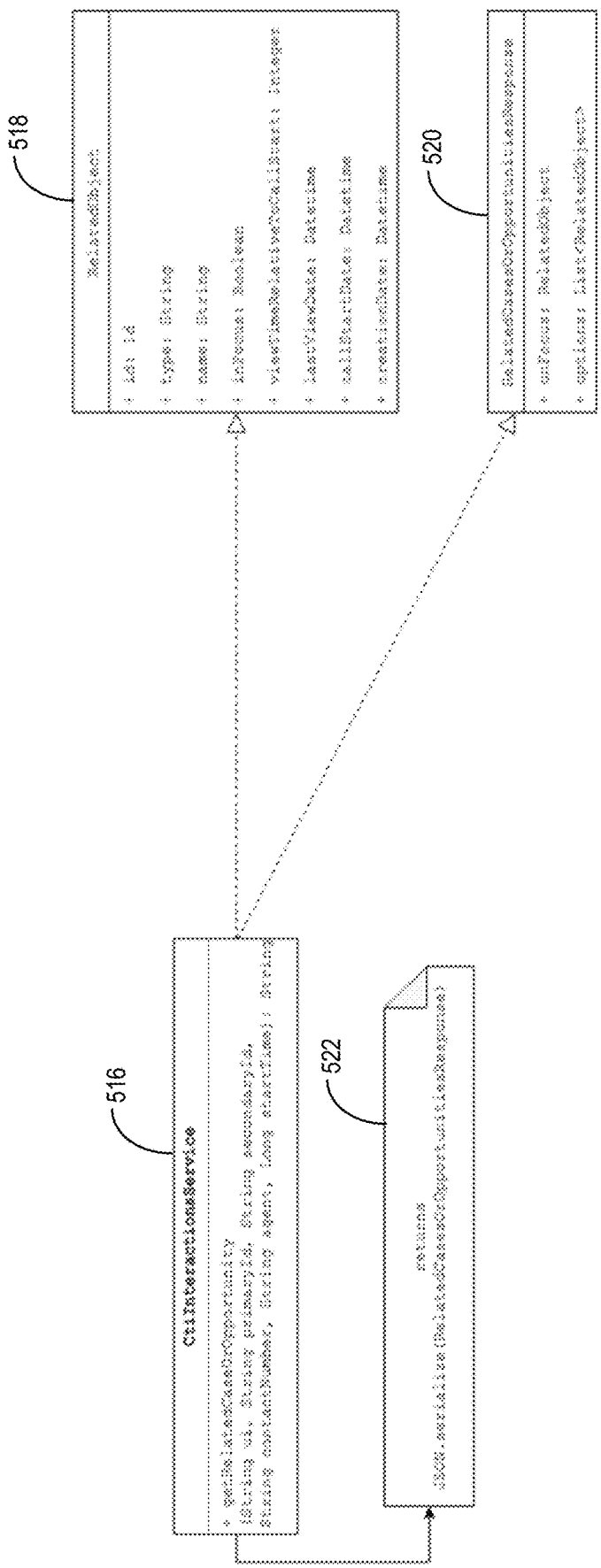
FIG. 5B illustrates an example CRM object request in accordance with one or more embodiments.
Figure 6:
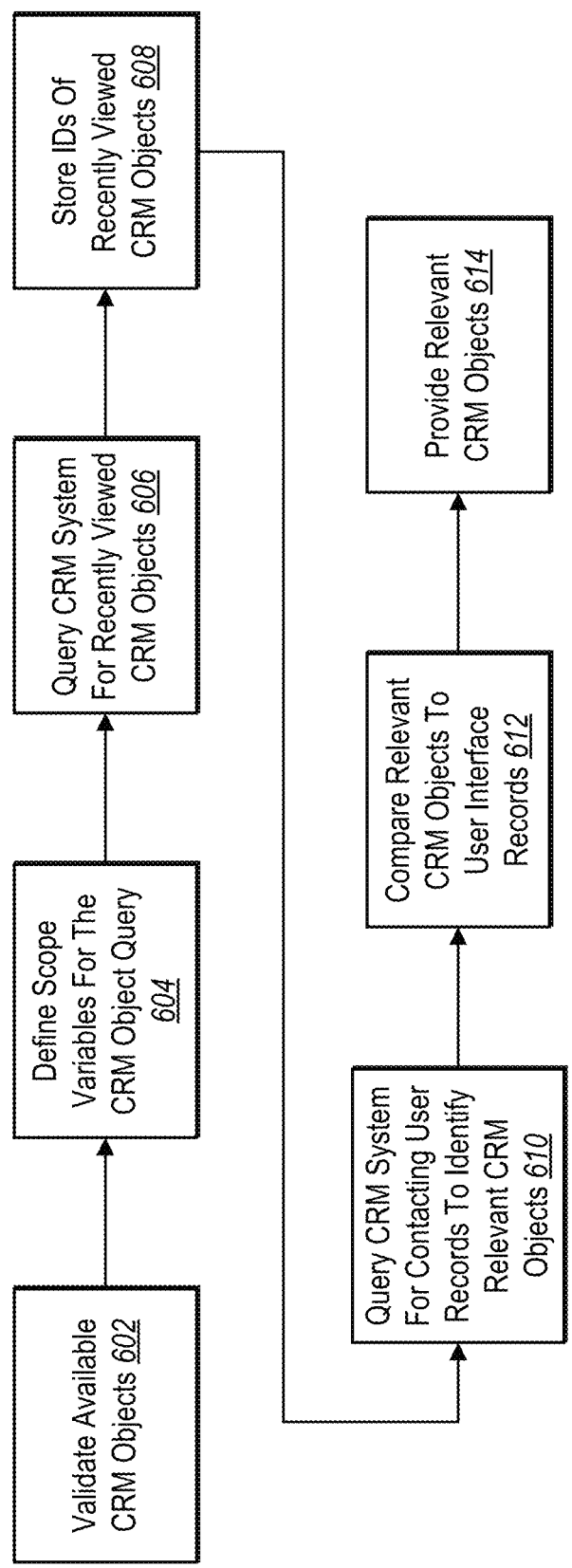
FIG. 6 illustrates an example sequence flow for determining and providing a CRM object to relate to a communication in accordance with one or more embodiments.

Moreover, as shown in FIG. 3, the contact activity relation system 100 utilizes such information to identify related CRM objects (in an act 306) that are relevant to the contacting user call 302 and/or the agent user interface (from the act 304 and as described in greater detail in FIGS. 5A, 5B, and 6). Upon identifying one or more related CRM objects (in the act 306), the contact activity relation system 100 provides (for display) a graphical user interface (e.g., a pop up GUI) in an act 308 that enables an agent to select one or more of the identified CRM objects. Then, the contact activity relation system 100 can relate (or associate) the CRM objects with the call information for the contacting user call 302 upon receiving a selection within the graphical user interface (of the act 308) for the one or more identified CRM objects. Indeed, the contact activity relation system 100 displaying a graphical user interface to enable an agent to select one or more relevant CRM objects for a contacting user communication and other interactions with the graphical user interface are described in greater detail in FIG. 4.

As an example, in reference to FIG. 3, the contact activity relation system 100 can establish a call between a contacting user and an agent (e.g., contacting user call 302) when a contacting user requests assistance with a technical problem with a product associated with a call center of the agent.

Then, in reference to FIG. 3, the contact activity relation system 100 can provide the agent with a CRM console user interface (e.g., in the act 304) to assist the agent in providing technical support to the contacting user. Furthermore, in reference to FIG. 3, the contact activity relation system 100 can track activities on the agent user interface, the communication information, and/or other information in relation to the contacting user call 302.

In addition, in reference to FIG. 3, the contact activity relation system 100 can identify relevant CRM objects for the contacting user call 302 using the tracked activities of the agent, the communication information, and/or other information (e.g., a case record corresponding to the contacting user and the technical support question). Then, in reference to FIG. 3, the contact activity relation system 100 can provide a graphical user interface (e.g., a pop screen GUI) in an act 308 that enables the agent to select the identified CRM object (e.g., a case record corresponding to the contacting user and the technical support question). Furthermore, the contact activity relation system 100 can also relate the case record (i.e., the CRM object) with the call information for the contacting user call 302 upon receiving a selection of the identified CRM object from the graphical user interface.

In one or more embodiments, the contact activity relation system 100 establishes various types of communication (e.g., a phone call, text messaging thread, an instant messaging thread, email communication, etc.) between a contacting user (e.g., via a contacting user device) and an agent (e.g., via an agent device) for a variety of purposes. For instance, the contact activity relation system 100 can establish communication between the contacting user and the agent for purposes such as, but not limited to, customer service, technical support, a sales pitch, and/or reservations (e.g., restaurants, flights, car rentals, etc.). Indeed, the contact activity relation system 100 can identify a CRM object that is related to any variety of communications and provide the related CRM object to communication information of the communication.

Furthermore, the contact activity relation system 100 can provide for display and/or track agent activity from various agent user interfaces such as, but not limited to, various CRM graphical user interfaces and/or CTI graphical user interfaces that correspond to the purpose of the contacting user call (e.g., customer service, technical support, a sales pitch, reservations, etc.). Indeed, the contact activity relation system 100 can display and/or track agent activity on a CRM console user interface that is selected and/or opened by an agent on an agent device for a specific contacting user call. Moreover, the contact activity relation system 100 can also display a graphical user interface to relate an identified CRM object (e.g., based on a relationship algorithm) to communication information within or in relation to any variety of agent user interface in accordance with one or more embodiments herein. In some embodiments, the contact activity relation system 100 operates as a stand-alone application that communicates with the agent user interface and/or as an integrated application within the agent user interface.

As mentioned above, the contact activity relation system 100 can display a graphical user interface to enable an agent to select one or more relevant CRM objects (identified in accordance with one or more embodiments herein) for a contacting user communication. For example, FIG. 4 illustrates an example of a graphical user interface generated and/or displayed by the contact activity relation system 100 that includes selectable options for one or more identified CRM objects. For instance, and as shown in FIG. 4, the contact activity relation system 100 can provide on an agent device 402 (e.g., in relation to a CRM console user interface 404) a GUI pop screen 406 for relating CRM objects that includes call information 408 (e.g., contacting user John Smith), a disposition of the call 410, and a "relate to" field 412 with selectable options 414 that each include CRM objects corresponding to case IDs and/or opportunity IDs (e.g., a technical support case 416a, a customer service case 416b, a sales lead 416c, and a none option 416d) the contact activity relation system 100 inferred to be relevant to the call with John Smith (in accordance with one or more embodiments herein).

As illustrated in FIG. 4, an agent simply has to select one of the displayed CRM objects (e.g., the technical support case 416a, the customer service case 416b, the sales lead 416c, and the none option 416d) and then select the "Log" button 418 to relate the selected CRM objects to the call information. For instance, in one or more embodiments, the contact activity relation system 100 automatically relates the call information to the selected one or more CRM objects (or vice versa) upon detecting a user selection of the selectable options 414 corresponding to the CRM objects (e.g., the technical support case 416a, the customer service case 416b, the sales lead 416c, and the none option 416d). Indeed, the contact activity relation system 100 significantly improves efficiency (e.g., both of computational resources and interactions with an user interface) over conventional systems by identifying such relevant CRM objects for a contacting user communication (e.g., for any variety of communication and/or agent user interface) and also enabling an agent to select the CRM object to associate with the communication information (e.g., without the agent having to identify such CRM objects across various applications/systems and utilize various applications to associate the CRM objects with the communication information).

In one or more embodiments, the contact activity relation system 100 can provide selectable options for one or more CRM objects in a graphical user interface to enable an agent to take a variety of actions for the CRM objects in relation to a contacting user (or communication information). For example, the contact activity relation system 100 can provide selectable options (e.g., buttons) that correspond to each relevant CRM object displayed in the graphical user interface to enable an agent to select and associate the CRM object to a contacting user (or communication information). Furthermore, the contact activity relation system 100 can also detect more than one selection of selectable options corresponding to more than one CRM object in order to associate multiple identified CRM objects to the contacting user (or communication information).

Additionally, the contact activity relation system 100 can also provide a selectable option for a CRM object that enables an agent to remove associations between the CRM object and the contacting user (or communication information). Moreover, in some embodiments, the contact activity relation system 100 also provides a selectable option for one or more CRM objects that enable an agent to merge the one or more CRM objects for the contacting user. For example, the contact activity relation system 100 can receive a selection of a merge option between two CRM objects (e.g., a technical support case and a customer service case) displayed in the graphical user interface for relating CRM objects to combine the two CRM objects. Indeed, the contact activity relation system 100 can, in response to detecting a user selection of a merge option, combine multiple CRM objects and associate the combined CRM objects to the contacting user (or communication information).

Moreover, the contact activity relation system 100 can also display other information and/or options within the graphical user interface for relating CRM objects. For example, as shown in FIG. 4, the contact activity relation system 100 can include a selectable option to set the disposition of the call 410. Indeed, the contact activity relation system 100 can detect a user selection from an agent for a selectable option corresponding to a disposition of a call (e.g., successful, unsuccessful, dropped call, etc.). Furthermore, based on a user selection of a selectable option corresponding to the disposition of the call, the contact activity relation system 100 can associate the disposition of the call with the contacting user and/or the CRM object selected for the contacting user.

Additionally, the contact activity relation system 100 can also include a text field to obtain notes from an agent and associate the notes provided by an agent with the contacting user and/or the CRM object selected for the contacting user. In addition, the contact activity relation system 100 can also provide selectable options for other information such as a rating for the contacting user and/or an overall rating for the communication and associate such information provided by the agent with the contacting user and/or the CRM object selected for the contacting user. Furthermore, the contact activity relation system 100 can also provide selectable options to remove and/or modify such information in relation to a selected CRM object and/or contacting user.

In one or more embodiments, the contact activity relation system 100 stores, associates, and/or saves data corresponding to a communication and/or contacting user with the selected CRM object. For example, upon associating a selected CRM object with communication information and/or a contacting user, the contact activity relation system 100 can associate any agent activity, agent information, information corresponding to the current communication (e.g., notes, dispositions, ratings, communication records/history such as, but not limited to, call recordings and/or transcriptions) with the selected CRM object. For instance, the contact activity relation system 100 can enable an agent to access a CRM object and provide such data when it is associated with the CRM object.

Furthermore, the contact activity relation system 100 can relate CRM objects to communications based on whether the contact activity relation system 100 can identify a contacting user associated with the communication. In one or more embodiments, the contact activity relation system 100 determines whether a contacting user associated with a communication can be identified within the CRM system or if the contacting user associated with the communication cannot be identified within the CRM system. For example, the contact activity relation system 100 determines if the CRM system includes a contact record associated with the contact information corresponding to the communication.

In the event that the contact activity relation system 100 identifies a contacting user associated with the communication (e.g., an inbound call) in the CRM system, the contact activity relation system 100 can utilize an identified contact application logic flow. For example, because the contact activity relation system 100 identified a contact ID, the contact activity relation system 100 can log the communication information to the contact ID in the CRM system. In the event that multiple contacts exist with the same contact information (e.g., a phone number), the contact activity relation system 100 can provide, on the agent client device, a graphical user interface with options to select one of the multiple contacting users and/or contact information. Moreover, the communication information can be related to the CRM object in focus (e.g., active in the agent user interface) at the end of the communication. If the CRM console in focus in the agent user interface does not have a CRM object (e.g., a CRM object corresponding to a case), then the contact activity relation system 100 may not log the communication to any CRM object (e.g., the contact activity relation system 100 infers that there is no need to relate the communication to any CRM object).

In the event that the contact activity relation system 100 does not identify a contacting user within the CRM system, the contact activity relation system 100 can utilize a different application logic flow to relate the communication information to relevant CRM objects. For example, in some embodiments the contact activity relation system 100 relates the communication information based on the CRM object in focus (e.g., active in the agent user interface) upon the end of the communication (e.g., when dispositions are disabled) or upon a disposition being set by the agent (e.g., when dispositions are enabled). For instance, if a CRM object is in focus upon the end of a communication (or upon a disposition being set), then the contact activity relation system 100 relates the communication information to that CRM object.

Alternatively, if an CRM object corresponding to an opportunity is in focus upon the end of the communication (or upon a disposition being set), then the contact activity relation system 100 relates the communication information to the CRM object corresponding to the activity. Moreover, if a CRM object corresponding to a case is in focus upon the end of the communication (or upon a disposition being set), the contact activity relation system 100 relates the communication information to the CRM object corresponding to the case. If a CRM object is created and associated with the CRM object corresponding to the case that is in focus, then the contact activity relation system 100 can relate the communication information to the CRM object that is in focus.

As mentioned above, the contact activity relation system 100 can identify one or more CRM objects that are relevant to a communication based on communication information and/or agent activity. For instance, the contact activity relation system 100 can utilize one or more parameters associated with a user interface, agent, and/or a communication to identify one or more CRM objects that are relevant to a communication. For example, FIG. 5A illustrates the contact activity relation system 100 utilizing one or more parameters associated with a user interface, agent, and/or a communication to identify one or more CRM objects that are relevant to a communication.

In particular, as shown in FIG. 5A, the contact activity relation system 100 can identify a CRM object in an act 502 by determining CRM objects that are relevant to a communication based on parameters such as user interface information 504, communication information 506, a start time 508 (e.g., a communication start time), and agent activities 510. Indeed, the contact activity relation system 100 can provide the parameters to a CRM system 512 to identify the CRM object in the act 502 by utilizing a relationship algorithm (as described in FIG. 6) to generate (or retrieve) one or more CRM objects 514 (e.g., CRM object ID 1, CRM object ID 2, . . . , CRM object ID N) from the CRM system 512.

Indeed, as mentioned above, the contact activity relation system 100 can utilize a variety of information to identify a CRM object. For example, as mentioned above, the contact activity relation system 100 can utilize information corresponding to a CRM console user interface (e.g., user interface information) as a parameter to identify a CRM object. In particular, the contact activity relation system 100 can utilize a CRM console user interface type and/or ID (e.g., the type of interface and/or type of program utilized by an agent) as a parameter to identify a CRM object. Furthermore, the contact activity relation system 100 can also utilize an ID and/or indicator corresponding to a tab object utilized and/or opened in a CRM console user interface as a parameter to identify a CRM object. Indeed, the contact activity relation system 100 can utilize multiple IDs and/or indicators corresponding to multiple tabs open and/or displayed in a CRM console user interface (e.g., a primary tab and a secondary tab) as a parameter to identify a CRM object. Additionally, the contact activity relation system 100 can utilize a session time corresponding to the agent user interface (e.g., the duration of time an agent has been using a CRM console user interface) as a parameter to identify a CRM object. Furthermore, the contact activity relation system 100 can also utilize identities and/or indicators of other interfaces utilized by an agent (e.g., web browsers, websites, and/or documents) as a parameter to identify a CRM object.

Moreover, the contact activity relation system 100 can utilize information corresponding to a communication (e.g., communication information) as a parameter to identify a CRM object. For instance, the contact activity relation system 100 can utilize information such as contact information related to the communication (e.g., a phone number, name, residential address, email, other IDs corresponding to a contacting user, etc.) as a parameter to identify a CRM object. In addition, the contact activity relation system 100 can also utilize the communication type (e.g., phone call, text message, email message, IM, etc.) as a parameter to identify a CRM object.

Additionally, the contact activity relation system 100 can utilize information corresponding to a time associated with the communication as a parameter to identify a CRM object. In particular, the contact activity relation system 100 can utilize the start time of a communication between a contacting user and an agent as a parameter to identify a CRM object. Indeed, the contact activity relation system 100 can also utilize other time periods relating to the communication as a parameter. For example, the contact activity relation system 100 can utilize a total duration of the communication and/or an end time of the communication as a parameter. Furthermore, the contact activity relation system 100 can also identify a time between two separate communications that have taken place between a contacting user and an agent (e.g., a time from the last communication between the contacting user and the agent).

Moreover, the contact activity relation system 100 can utilize information corresponding to agent activity as a parameter to identify a CRM object. For instance, the contact activity relation system 100 can track agent activity in relation to a communication between a contacting user and the agent and utilize such tracked agent activity as a parameter. In particular, the contact activity relation system 100 can track activity such as, but not limited to, steps taken on a CRM console user interface by the agent, information accessed by the agent on the agent user interface and/or other interface on the agent device (e.g., specific technical support pages and/or product pages accessed by the agent), and/or selections made by the agent on the agent user interface. Furthermore, the contact activity relation system 100 can track agent activity such as recently viewed records and/or recently viewed contacts. Indeed, the contact activity relation system 100 can utilize such tracked activity as a parameter to identify a CRM object.

Furthermore, the contact activity relation system 100 can track such agent activities of an agent to use as a parameter in association with a time period (or time frame). For instance, the contact activity relation system 100 can track such agent activities during the duration of a communication between a contacting user and the agent. Furthermore, in some embodiments, the contact activity relation system 100 tracks such agent activities prior to and during the communication (e.g., tracks and/or accesses agent activities within a configured threshold time period before the start of the communication). Likewise, the contact activity relation system 100 can also track agent activities after the communication (e.g., using a configured threshold time period after the end of the communication). Indeed, the contact activity relation system 100 can utilize agent activities tracked prior to, during, and after a communication as a parameter to identify a CRM object. Furthermore, the contact activity relation system 100 can utilize a configured threshold time period that is configured by an administrator.

In one or more embodiments, the contact activity relation system 100 utilizes communication information (e.g., contact information) and agent activity to identify one or more relevant CRM objects to relate to a communication. While the above provides a specific set of parameters (e.g., communication information and agent activity) utilized to identify relevant CRM objects, it is understood that the contact activity relation system 100 can identify and generate related CRM objects based on a wide-variety of parameters and any combination thereof (e.g., parameters based one or more types of information described above).

As previously mentioned, the contact activity relation system 100 can utilize one or more parameters (described above) to identify CRM objects (e.g., CRM objects related to a communication and/or contacting user). Indeed, the contact activity relation system 100 can identify any number of related CRM objects for a communication. Furthermore, the contact activity relation system 100 can identify any type of CRM object for the communication. For example, the contact activity relation system 100 can identify cases, such as, but not limited to, customer service cases, technical support tickets, service requests for an installation visit, a scheduled car service appointment, and/or flight reservations as CRM objects. Moreover, the contact activity relation system 100 can identify opportunities such as, but not limited to, sales leads, products of interest to a contacting user, and/or possible service upgrades for a contacting user as CRM objects.

As an example, the contact activity relation system 100 can identify one or more CRM objects that are relevant to a communication based on one or more parameters using a request to a CRM system. Indeed, the contact activity relation system 100 can query and obtain a variety of CRM objects based on parameters (as input to the query). For example, as illustrated in FIG. 5B, the contact activity relation system 100 can utilize a request call 516 for a related cased or opportunity, e.g., "+get RelatedCaseOrOpportunity," which includes various parameters for input. As shown in FIG. 5B, request call 516 includes parameters such as: 1) String ui: the type of UI being used by the agent; 2) String primaryId: an ID of the primary tab in the agent user interface; 3) String secondary Id: ID of the secondary tab in the agent user interface; 4) String contactNumber: client contact information provided by communication management system (e.g., Callbar); 5) String agent: information corresponding to the agent in the call and/or agent activity; and 6) Long startTime: the time at which the call has started.

Indeed, as shown in FIG. 5B, the contact activity relation system 100 utilizes the request call 516 to obtain a CRM object 518 (e.g., an object having an ID, a type, a name, an indication of whether it is relevant to the call using a "inFocus" Boolean, a view time relative to the start of the call, a last view date, a call start date and time, and a creation time for the object). Furthermore, as illustrated in FIG. 5B, the contact activity relation system 100 checks whether one or more identified CRM objects (e.g., the CRM object 518) are "inFocus" (e.g., relevant to the call) and adds the CRM object to a list of selectable options in the function 520. Then, the contact activity relation system 100 can utilize the list of selectable option from the function 520 (having one or more CRM objects) to return a JSON response 522 (e.g., a response to serialize the one or more identified and relevant CRM objects within an agent user interface to show the results in a pick list).

As mentioned above, the contact activity relation system 100 can utilize a relationship algorithm to identify (or obtain) CRM objects to relate to a communication and/or a contacting user. Indeed, the contact activity relation system 100 can utilize a relationship algorithm that performs a various set of actions to identify CRM objects to relate to a communication and/or a contacting user. In particular, the contact activity relation system 100 can (using the relationship algorithm) query a CRM system to identify recently viewed CRM objects (e.g., based on a start time of the communication and/or agent activity) and match the recently viewed CRM objects with one or more contacting user records on the CRM system to identify related CRM objects for the communication and/or contacting user. Then, the contact activity relation system 100 can provide the relevant CRM objects with corresponding selectable options (as described above) to enable an agent handling the communication to select and relate one or more of the relevant CRM objects with the communication.

For instance, FIG. 6 illustrates a set of actions the contact activity relation system 100 performs in regard to one embodiment of the relationship algorithm. In particular, as shown in FIG. 6, the contact activity relation system 100 validates available CRM objects in an act 602, defines scope variables for a CRM object query in an act 604, and then queries a CRM system for recently viewed CRM objects in an act 606. Furthermore, as illustrated in FIG. 6 and after querying the CRM system for the recently viewed CRM objects, the contact activity relation system 100 stores IDs of the recently viewed CRM objects in an act 608, queries the CRM system for contacting user records to identify relevant CRM objects in an act 610, then compares the relevant CRM objects to the user interface records in an act 612, and provides the relevant CRM objects in an act 614 (e.g., in a pick list presented within a pop screen GUI).

As illustrated in FIG. 6, the contact activity relation system 100 can validate available CRM objects in the act 602. In particular, in some embodiments, the contact activity relation system 100 can validate a "relate to" option in the CRM system (e.g., a "relate to" flag associated with a CRM object and/or a CRM console user interface). For instance, the contact activity relation system 100 can first validate how the "relate to" flag is defined in the custom settings of a CRM system (e.g., configured by an administrator of the CRM system). In particular, the contact activity relation system 100 can determine if the "relate to" option is disabled or enabled for a CRM object and/or for a CRM console user interface.

As an example, the contact activity relation system 100 can determine that a "relate to" option for a type of CRM object (e.g., cases) is enabled for a CRM console user interface (e.g., the agent user interface utilized during a communication) and in response can query for the type of CRM object (e.g., cases). Moreover, as an example, the contact activity relation system 100 can determine that a "relate to" option for a second type of CRM object (e.g., opportunities) is disabled for a CRM console user interface and in response can ignore the second type of CRM objects (e.g., opportunities) during the query. Indeed, the contact activity relation system 100 can determine a "relate to" option for a variety of CRM objects and/or agent user interface to determine the scope of CRM objects to utilize during a CRM object query (e.g., if enabled, the contact activity relation system 100 determines the specific setting for the query of CRM objects such as enabled for cases, enabled for opportunities, enabled for cases and opportunities).

Furthermore, as shown in FIG. 6, the contact activity relation system 100 can define scope variables for the CRM object query in the act 604. For example, the contact activity relation system 100 defines the scope variables (e.g., necessary scope variables) in order to validate the use of a CRM console (e.g., console belonging to a CRM system), manage recently viewed records (e.g., CRM object records), and/or define a service response (e.g., a response including one or more CRM objects). For instance, the contact activity relation system 100 can define scope variables for the CRM object query to configure and/or determine a time frame for the CRM object records. Furthermore, the contact activity relation system 100 can also utilize one or more input parameters (as described above) to define the scope of the CRM object query (e.g., limit the query to a specific agent, specific agent activity, a start time of the communication, etc.).

As an example, the contact activity relation system 100 can define a timestamp (or time range) in which CRM objects will be queried using the start time of the communication. For instance, the contact activity relation system 100 can define a timestamp by subtracting a threshold time (e.g., a time configured by an administrator and/or a time that is a static value in the relationship algorithm) from the start time of the communication to limit a CRM object query to recently viewed CRM objects (e.g., before the beginning of a communication). As an example, in some embodiments, the contact activity relation system 100 subtracts three minutes from the start time of the communication to limit a CRM object query to recently viewed CRM objects (e.g., from the beginning of a communication).

Additionally, as shown in FIG. 6, the contact activity relation system 100 can query the CRM system for recently viewed CRM objects in the act 606. For instance, after defining the scope of variables (in the act 604), the contact activity relation system 100 can query the CRM system for recently viewed objects. For example, having defined the scope variables, a query is made to the CRM system for recently viewed CRM objects. In particular, the contact activity relation system 100 can query the CRM system to retrieve the ID and/or type of recently viewed CRM objects. Indeed, the contact activity relation system 100 can retrieve any number of CRM objects. In some embodiments, the contact activity relation system 100 retrieves a threshold number of CRM objects (from the query). For instance, the contact activity relation system 100 can retrieve both the Id and Type of eight, thirty, and/or fifty (e.g., example threshold numbers of CRM objects) of the recently viewed CRM object records. In some embodiments, the contact activity relation system 100 retrieves thirty of the recently viewed CRM object records as the default number of CRM object records. Furthermore, the contact activity relation system 100 can order the CRM objects from the most recent to the least recent with respect to when the agent viewed the CRM objects.

Furthermore, as illustrated in FIG. 6, the contact activity relation system 100 can store IDs of recently viewed CRM objects in the act 608. For instance, the contact activity relation system 100 can store IDs of recently viewed CRM object records (e.g., the CRM objects identified in the act 604 above). For example, in some embodiments, the contact activity relation system stores the ID's of the recently viewed records in a set (e.g., relatedIds) for later cross reference (e.g., with communication information to relate one or more CRM objects with a communication). In one or more embodiments, the contact activity relation system 100 can determine if one obr more tabs and/or CRM objects open on a CRM console user interface should be considered a recently viewed CRM object. In particular, the contact activity relation system 100 can determine (e.g., when the agent device is running in the CRM console) if one or more CRM object tabs are opened during the communication (e.g., either the primaryId or secondaryId arguments are valid). Indeed, if a tab (e.g., a CRM object tab) is open in the agent user interface, the contact activity relation system 100 can add the CRM object corresponding to the tab to the set of recently viewed CRM objects (e.g., as a relatedID).

Moreover, as illustrated in FIG. 6, the contact activity relation system 100 can query the CRM system for contacting user records to identify relevant CRM objects in the act 610. For instance, in order to relate one or more CRM objects to a communication and/or contacting user, the contact activity relation system 100 queries contact information and/or communication records in the CRM system to obtain the contacting user contact records (e.g., the contact records corresponding to the communication between an agent and the contacting user). Further, the contact activity relation system 100 queries for CRM objects (e.g., from the recently viewed CRM objects and/or the CRM objects available on the CRM system) having an association with the contacting user contact records (e.g., the respective contacting user contact having an assignment to a CRM object).

Indeed, the contact activity relation system 100 can utilize the CRM objects having an association with the contacting user records and/or the recently viewed CRM objects (e.g., identified in the act 606) to relate to a communication and/or contacting user. Furthermore, based on the validation settings (from the act 602) the contact activity relation system 100 can utilize any type of CRM object (e.g., cases and/or opportunities) based an association with the contacting user contact records and/or based being a recently viewed CRM object (e.g., the "relatedId" set). Furthermore, in reference to FIG. 5B, the contact activity relation system 100 can instantiate such CRM objects into a "RelatedCase" and/or "RelatedOppy" class which are extensions of the "RelatedObject" class.

Additionally, as illustrated in FIG. 6, the contact activity relation system 100 can compare the relevant CRM objects to the user interface records in the act 612. In particular, the contact activity relation system 100 can compare one or more relevant CRM objects (identified based on the contacting user records and/or as recently viewed CRM objects) to instances of tabs (e.g., tabs associated with CRM objects) on a CRM console user interface. Moreover, if a relevant CRM object that matches with a CRM object (e.g., a CRM object ID) associated with a tab instance (e.g., a primary or secondary user interface tab) on the agent user interface, the contact activity relation system 100 can relate the relevant CRM object to the communication and/or contacting user by default. Furthermore, in the case that the agent is not utilizing a CRM console user interface (e.g., a console), the contact activity relation system 100 can utilize the most recently viewed CRM object that also has an association with the contacting user record.

In addition and as previously mentioned, the contact activity relation system 100 can provide one or more relevant CRM objects as selectable options within a graphical user interface to enable an agent to select a CRM object to relate to a communication and/or a contacting user. For example, as shown in FIG. 6, the contact activity relation system 100 can provide relevant CRM objects in the act 614 (e.g., in a graphical user interface in accordance with one or more embodiments herein). Indeed, the contact activity relation system 100 can provide the one or more relevant CRM objects (identified based on the contacting user records and/or as recently viewed CRM objects) as selectable options within a graphical user interface on an agent device corresponding to the communication. Moreover, the contact activity relation system 100 can detect a selection of one or more of the CRM objects and relate the selected CRM objects to the corresponding communication and/or contacting user (e.g., in accordance with one or more embodiments herein). Indeed, in some embodiments, the contact activity relation system 100 provides a JSON response (e.g., a response to serialize the one or more identified and relevant CRM objects within a CRM console user interface) including the one or more related CRM objects for selection.

Figure 7:
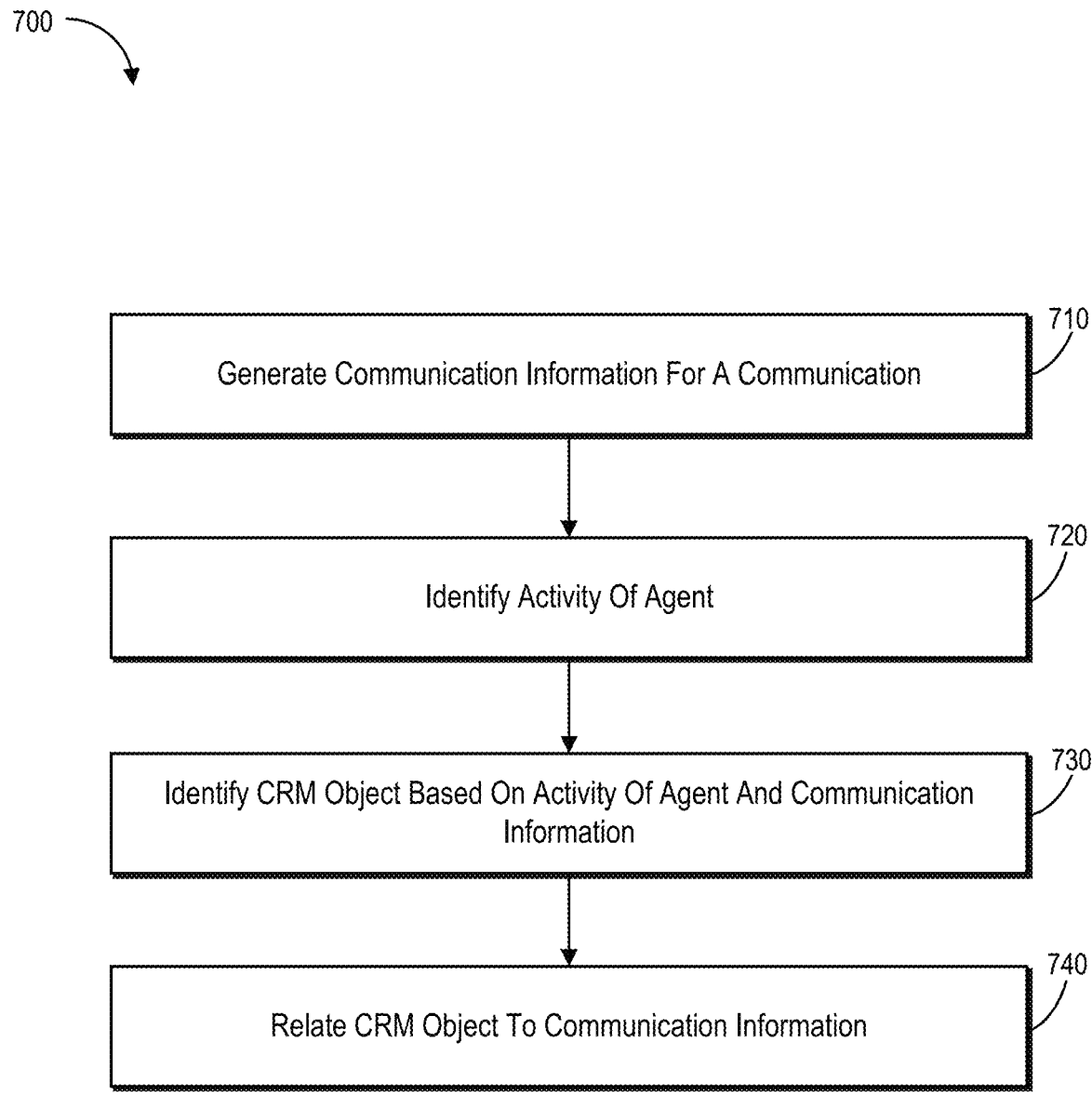
FIG. 7 illustrates a flowchart of a series of acts for relating communication information with CRM objects that are related to the communication in accordance with one or more embodiments.

FIGS. 1-6, the corresponding text, and the examples provide a number of different methods, systems, devices, and non-transitory computer-readable media of the contact activity relation system 100. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for relating communication information with CRM objects that are related to the communication in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As illustrated in FIG. 7, the series of acts 700 includes an act 710 of generating communication information for a communication. In particular, the act 710 can include generating communication information for a communication handled at an agent device associated with an agent.

As illustrated in FIG. 7, the series of acts 700 includes an act 720 of identifying activity of an agent. In particular, the act 720 can include identifying activity of an agent within a customer-relationship management system console. Furthermore, the act 720 can include identifying one or more parameters corresponding to a communication handled at an agent device associated with an agent. For instance, the one or more parameters can include at least one of user interface information utilized by the agent, agent information, or a start time for the communication handled at the agent device. Furthermore, the act 720 can also include identifying activity of an agent within a CRM console associated with a time period related to a communication.

As illustrated in FIG. 7, the series of acts 700 includes an act 730 of identifying a CRM object based on activity of an agent and communication information. In particular, the act 730 can include identifying a CRM object based on an activity of an agent within a CRM console and communication information. Furthermore, the act 730 can include identifying an additional CRM object based on an activity of the agent within a CRM console and communication information. Additionally, the act 730 can include identifying one or more CRM objects accessed by an agent within a threshold time period. Further, the act 730 can include selecting a CRM object from one or more CRM objects based on communication information. Furthermore, the act 730 can include identifying a CRM object based on one or more parameters.

As illustrated in FIG. 7, the series of acts 700 includes an act 740 of relating a CRM object to communication information. Furthermore, the act 740 can include displaying a CRM object within a graphical user interface related to a communication handled at an agent device. Moreover, the act 740 can include providing one or more selectable options corresponding to a CRM object within the graphical user interface. For instance, a selectable option can include a selectable option to relate a CRM object to communication information for a communication. Furthermore, the act 740 can include receiving an indication of a selection of a selectable option to relate a CRM object to communication information for a communication. For instance, relating a CRM object to communication information for a communication is based on an indication of a selection (of a selectable option to relate a CRM object to the communication information). Moreover, the act 740 can also include providing one or more selectable options corresponding to an additional CRM object within a graphical user interface. For example, the CRM object can include a case, a lead, a product, or a customer account.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
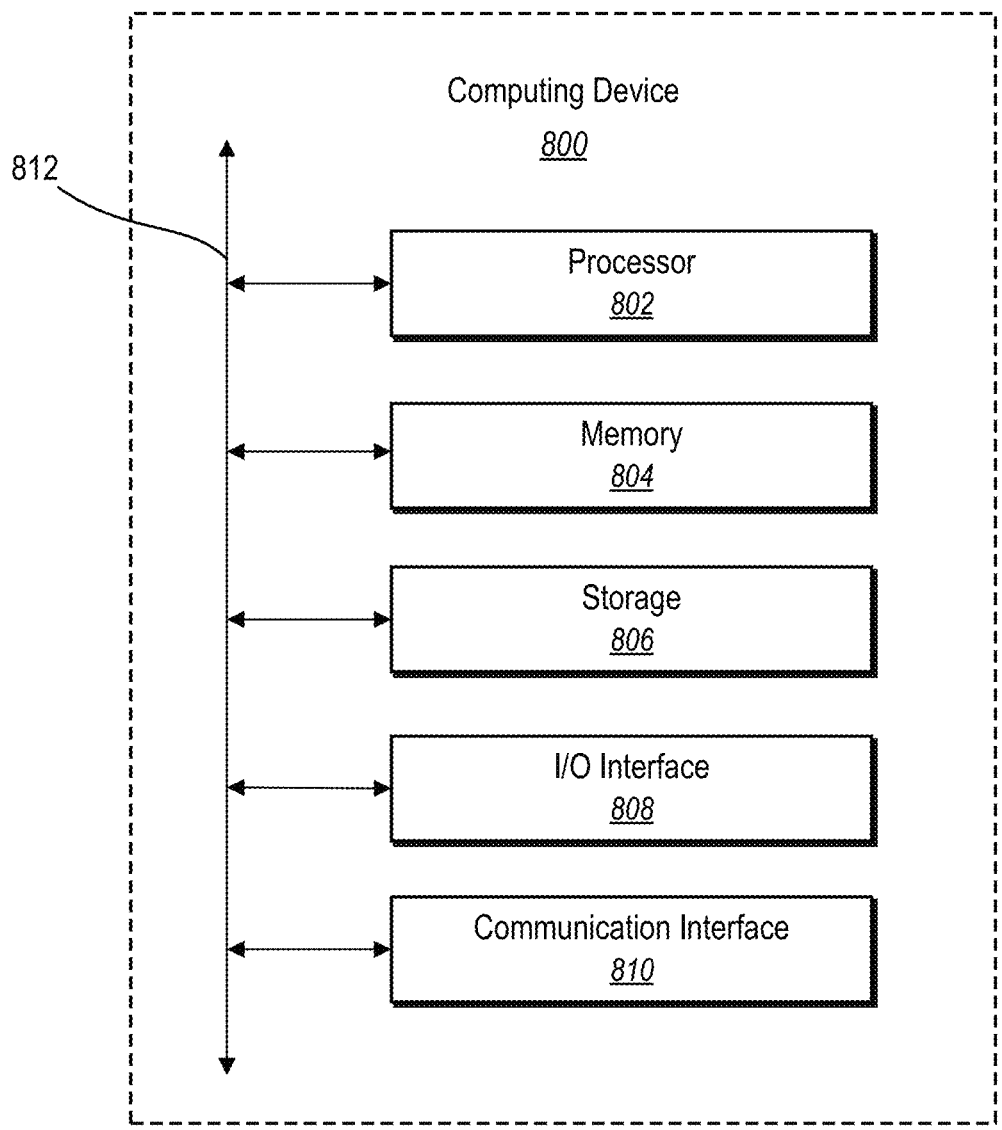
FIG. 8 illustrates an example computing device in accordance with one or more embodiments.

FIG. 8 illustrates, in block diagram form, an example computing device 800 (e.g., the computing device 800, the contacting user device 118, the agent device 116, the server device(s) 102, and/or the server device(s) 108) that may be configured to perform one or more of the processes described above. One will appreciate that the communication management system can comprise implementations of the computing device 800. As shown by FIG. 8, the computing device can comprise a processor 802, memory 804, a storage device 806, an I/O interface 808, and a communication interface 810. Furthermore, the computing device 800 can include an input device such as a touchscreen, mouse, keyboard, etc. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, storage device 806 can comprise a non-transitory storage medium described above. The storage device 806 may include a hard disk drive (HDD), flash memory, a Universal Serial Bus (USB) drive or a combination of these or other storage devices.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a writing device or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

Figure 9:
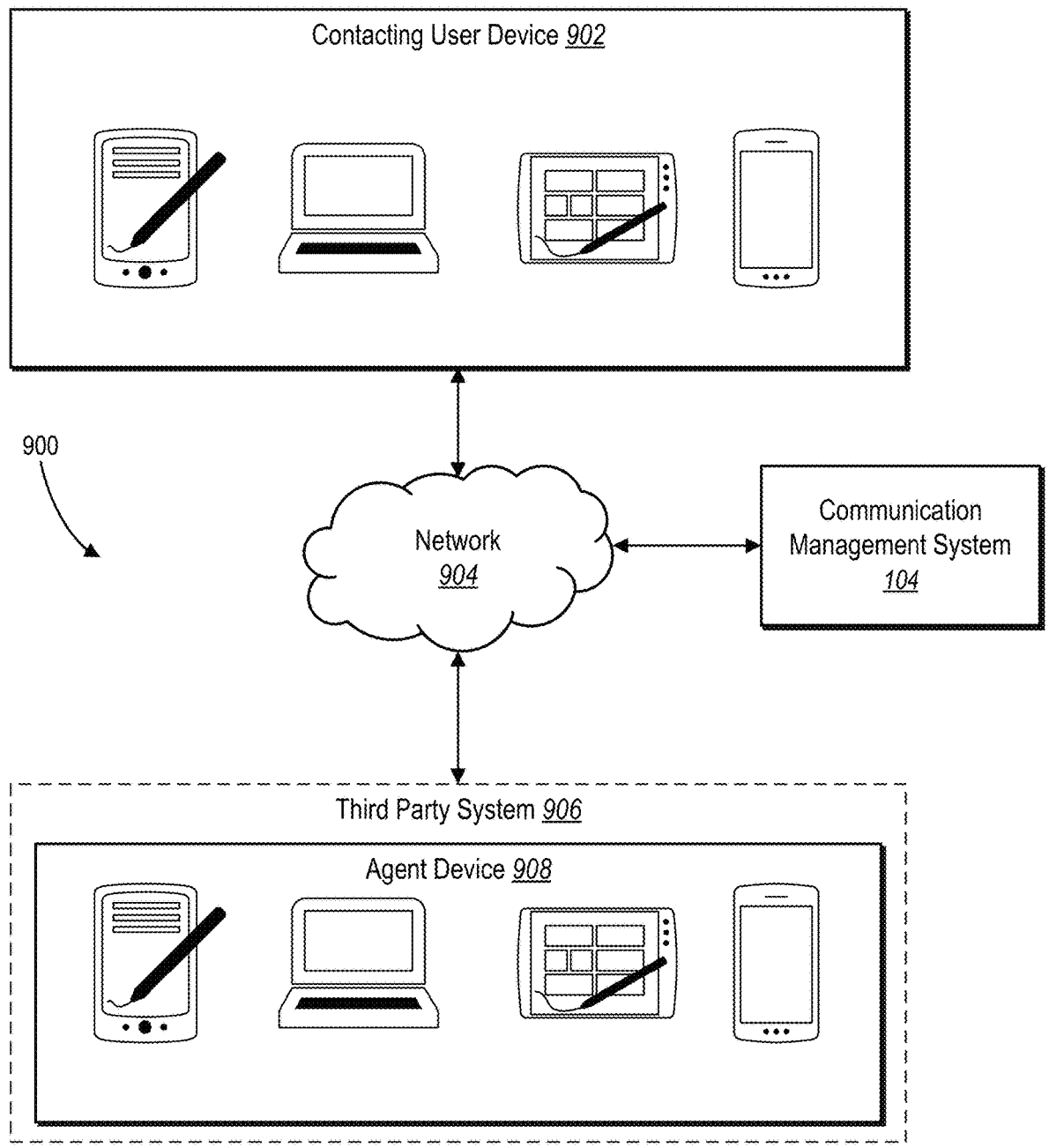
FIG. 9 illustrates an example network environment of a communication management system in accordance with one or more embodiments.

FIG. 9 illustrates an example network environment 900 of a communication management system. Network environment 900 includes a contacting user device 902 (e.g., the contacting user device 118), a communication management system 104, a third-party system 906, and an agent device 908 connected to each other by a network 904. Although FIG. 9 illustrates a particular arrangement of the contacting user device 902, the communication management system 104, the agent device 908, the third-party system 906, and network 904, this disclosure contemplates any suitable arrangement of the contacting user device 902, the communication management system 104, the third-party system 906, the agent device 908, and the network 904. As an example, and not by way of limitation, two or more of the contacting user device 902, the communication management system 104, the agent device 908, and the third-party system 906 may be connected to each other directly, bypassing network 904. As another example, two or more of the contacting user device 902, the communication management system 104, the agent device 908, and the third-party system 906 may be physically or logically co-located with each other in whole or in part. Moreover, although FIG. 9 illustrates a particular number of contacting user devices 902, communication management systems 104, agent devices 908, third-party systems 906, and networks 904, this disclosure contemplates any suitable number of contacting user devices 902, communication management systems 104, agent devices 908, third-party systems 906, and networks 904. As an example, and not by way of limitation, network environment 900 may include multiple contacting user devices 902, communication management systems 104, agent devices 908, third-party systems 906, and networks 904.

This disclosure contemplates any suitable network 904. As an example, and not by way of limitation, one or more portions of the network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 904 may include one or more networks 904.

Links may connect the contacting user device 902, the communication management system 104, the agent device 908, and the third-party system 906 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the contacting user device 902 and/or agent device 908 may be an electronic device including hardware, software, or embedded logic components or a combination of two or more such components capable of carrying out the appropriate functionalities implemented or supported by the contacting user device 902 and/or agent device 908. As an example, and not by way of limitation, a contacting user device 902 or agent device 908 may include any of the computing devices discussed above in relation to FIG. 8. A contacting user device 902 may enable a network user (e.g., a contacting user) at the contacting user device 902 to access the network 904. A contacting user device 902 may enable its user to communicate with other users at other contacting user devices 902 and/or agent devices 908. Likewise, an agent device 908 may enable its user to communicate with contacting user devices 902, third-party systems 906, and/or the communication management system 104.

In particular embodiments, the agent device 908 is part of (e.g., housed within, either entirely or in part) the third-party system 906. For example, the third-party system 906 may include a service system which maintains one or more agent users, each associated with a separate agent device 908. Accordingly, the communication management system 104 provides various functionality, user interfaces, electronic communications, and other information to the agent device 908 via the third-party system 906. In other embodiments, the agent device 908 is not associated with or part of a third-party system 906. Rather, the agent device 908 refers to a client device associated directly with the communication management system 104 or a different third-party and that communicates with the communication management system 104 without interaction via the third-party system 906.

In particular embodiments, the contacting user device 902 and/or the agent device 908 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at contacting user device 902 and/or agent device 908 may enter a Uniform Resource Locator (URL) or other address directing the web browser to a particular server (such as server, or a server associated with a third-party system 906), and the web browser may generate a Hyper Text Transfer Protocol (HTTP) request and communicate the HTTP request to server. The server may accept the HTTP request and communicate to the contacting user device 902 (or the agent device 908) one or more Hyper Text Markup Language (HTML) files responsive to the HTTP request. The contacting user device 902 and/or agent device 908 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the communication management system 104 may be a network-addressable computing system that can host an online communication network. The communication management system 104 may generate, store, receive, and send messaging data, such as, for example, text data, audio data, and video data. The communication management system 104 can further generate, store, receive, and send other data such as user-profile data, location data, or other suitable data related to the online communication network. The communication management system 104 may be accessed by the other components of network environment 900 either directly or via network 904. In particular embodiments, the communication management system 104 may include one or more servers. Each server may be a unitary server or a distributed server spanning multiple computers or multiple datacenters. Servers may be of various types, such as, for example and without limitation, a web server, a communication server, a news server, a mail server, a message server, an advertising server, a file server, an application server, an exchange server, a database server, a proxy server, or another server suitable for performing functions or processes described herein, or any combination thereof. In particular embodiments, each server may include hardware, software, or embedded logic components or a combination of two or more such components for carrying out the appropriate functionalities implemented or supported by server.

In particular embodiments, the communication management system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a contacting user device 902, a communication management system 104, an agent device 908, or a third-party system 906 to manage, retrieve, modify, add, or delete, the information stored in data store.

In particular embodiments, the communication management system 104 may store one or more correspondences in one or more data stores. In particular embodiments, a correspondence may include electronic messages—which may include digital audio, digital video, and/or digital text (e.g., as received in an electronic message or as transcribed from digital audio). The communication management system 104 may provide users (e.g., contacting users) of the online communication network the ability to communicate and interact with other users (e.g., agent users). In particular embodiments, agent users may join the online communication network via the communication management system 104, and the communication management system 104 may maintain connects for the agent users, including current and historical information relating to contacting users with whom the agent users interact.

In particular embodiments, the communication management system 104 may provide agent users with the ability to take actions on various types of items or objects, supported by communication management system 104. As an example, and not by way of limitation, the items and objects may include groups or individual contacting users communicating with the communication management system 104, computer-based applications that a user may use, transactions that allow agent users to buy, return, or sell items or services, indications that allow agent users to report events, or other interactions with various operations that an agent user may perform to assist a contacting user.

In particular embodiments, communication management system 104 may be capable of linking a variety of entities. As an example, and not by way of limitation, communication management system 104 may enable users such as contacting users and agent users to interact with each other as well as receive content from third-party systems 906 or other entities, or to allow users to interact with these entities through an application programming interfaces (API) or other communication channels.

In particular embodiments, a third-party system 906 may include one or more types of servers, one or more data stores, one or more interfaces, including but not limited to APIs, one or more web services, one or more content sources, one or more networks, or any other suitable components, e.g., that servers may communicate with. A third-party system 906 may be operated by a different entity from an entity operating the communication management system 104. In particular embodiments, however, communication management system 104 and third-party systems 906 may operate in conjunction with each other to provide communication services to users of the communication management system 104 or third-party systems 906. In this sense, the communication management system 104 may provide a platform, or backbone, which other systems, such as third-party systems 906, may use to provide communication services and functionality to users across the Internet or other network.

In particular embodiments, a third-party system 906 may include a third-party service system. A third-party content service system may include one or more sources of products or services that are used by contacting user. As an example, and not by way of limitation, a service system can include a traffic monitoring system, a social networking system, an emergency reporting system, a home repair system, a weather monitoring system, an internet service provider system, an airline system, a transportation provider system, a news media system, a travel accommodation system, an electronic smart appliance distribution or monitoring system, or a power distribution or monitoring system.

In particular embodiments, the communication management system 104 may include a variety of servers, subsystems, programs, modules, logs, and data stores. In particular embodiments, the communication management system 104 may include one or more of the following: a web server, action logger, API-request server, notification controller, action log, inference module, search module, advertisement-targeting module, user-interface module, user-profile store, third-party content store, or location store. The communication management system 104 may also include suitable components such as network interfaces, security mechanisms, load balancers, failover servers, management-and-network-operations consoles, other suitable components, or any suitable combination thereof. In particular embodiments, the communication management system 104 may include one or more user-profile stores for storing user profiles (e.g., for contacting users). A user profile may include, for example, contacting user information, biographic information, demographic information, behavioral information, social information, or other types of descriptive information, such as work experience, educational history, hobbies or preferences, interests, affinities, or location.

The web server may include a mail server or other messaging functionality for receiving and routing messages between the communication management system 104 and one or more contacting user devices 902 or agent devices 908. An API-request server may allow a third-party system 906 to access information from the communication management system 104 by calling one or more APIs. An action logger may be used to receive communications from a web server about a user's actions on or off the communication management system 104. Information may be pushed to a contacting user device 902 and/or agent device 908 as notifications, or information may be pulled from contacting user device 902 responsive to a request received from contacting user device 902 or agent device 908.

What is claimed is:

1. A method comprising:
generating communication information for a communication handled at an agent device associated with an agent, the agent device being part of a subscriber system;
identifying activity of the agent relating to the communication;
identifying, within a customer relationship management (CRM) system that is coupled over a network with the subscriber system, at least one CRM object data structure by applying a relationship algorithm to the activity of the agent and the communication information, the CRM object data structure being stored in a database of the CRM system and including an object identifier, a relate to field, and at least one record;
displaying a graphical user interface related to the communication handled at the agent device, the graphical user interface including selectable options for each of the at least one CRM object data structure;
receiving, through the graphical user interface a selection of at least one of the selectable options; and
relating the at least one CRM object data structure corresponding to the at least one of the selectable options to the communication information for the communication by modifying the relate to field in the at least one CRM object data structure.

2. The method of claim 1, further comprising:
identifying one or more parameters corresponding to the communication handled at the agent device associated with the agent, wherein the one or more parameters comprise at least one of:
user interface information utilized by the agent;
agent information; or
a start time for the communication handled at the agent device; and
wherein identifying the CRM object data structure is further based on the one or more parameters.

3. The method of claim 1, wherein identifying the activity of the agent further comprises identifying the activity of the agent associated with a time period related to the communication.

4. The method of claim 1, wherein the at least one record represents at least one of:
a case;
a lead;
a product; or
a customer account.

5. The method of claim 1, wherein identifying the at least one CRM object data structure based on the activity of the agent further comprises:
identifying one or more CRM object data structures accessed by the agent within a threshold time period; and
selecting the at least one CRM object data structure from the one or more CRM object data structures based on the communication information.

6. A non-transitory computer-readable medium storing instructions that, when
executed by at least one processor, cause a computer system to:
generate communication information for a communication handled at an agent device associated with an agent, the agent device being part of a subscriber system;
identify activity of the relating to the communication;
identify, within a customer relationship management (CRM) system that is coupled over a network with the subscriber system, at least one CRM object based on the activity of the agent and the communication information, the CRM object data structure being stored in a database of the CRM system and including an object identifier, a relate to field, and at least one record;
display a graphical user interface related to the communication handled at the agent device, the graphical user interface including selectable options for each of the at least one CRM object data structure;
receive, through the graphical user interface a selection of at least one of the selectable options; and
relate the at least one CRM object data structure corresponding to the at least one of the selectable options to the communication information for the communication by modifying the relate to field in the at least one CRM object data structure.

7. The non-transitory computer-readable medium of claim 6, further comprising
instructions that, when executed by the at least one processor, cause the computer system to:
identify one or more parameters corresponding to the communication handled at the agent device associated with the agent, wherein the one or more parameters comprise at least one of:
user interface information utilized by the agent;
agent information; or
a start time for the communication handled at the agent device; and
wherein identifying the CRM object data structure is further based on the one or more parameters.

8. The non-transitory computer-readable medium of claim 6, wherein identifying
the activity of the agent further comprises identifying the activity of the agent associated with a time period related to the communication.

9. A system comprising:
at least one processor; and
at least one non-transitory computer-readable storage medium storing instructions that, when executed by the at least one processor, cause the system to:
generate communication information for a communication handled at an agent device associated with an agent, the agent device being part of a subscriber system;
identify activity of the agent relating to the;
identify, within a customer relationship management (CRM) system that is coupled over a network with the subscriber system, at least one CRM object based on the activity of the agent and the communication information, the CRM object data structure being stored in a database of the CRM system and including an object identifier, a relate to field, and at least one record;
display a graphical user interface related to the communication handled at the agent device, the graphical user interface including selectable options for each of the at least one CRM object data structure;
receive, through the graphical user interface a selection of at least one of the selectable options; and
relate the at least one CRM object data structure corresponding to the at least one of the selectable options to the communication information for the communication by modifying the relate to field in the at least one CRM object data structure.

10. The system of claim 9, further comprising instructions that, when executed by
the at least one processor, cause the system to:
identify one or more parameters corresponding to the communication handled at the agent device associated with the agent, wherein the one or more parameters comprise at least one of:
user interface information utilized by the agent;
agent information; or
a start time for the communication handled at the agent device; and
wherein identifying the CRM object data structure is further based on the one or more parameters.

11. The system of claim 9, wherein identifying the activity of the agent further comprises identifying the activity of the agent associated with a time period related to the communication.

* * * * *